United States Patent [19]

Hedberg et al.

[11] Patent Number: 4,895,598

[45] Date of Patent: Jan. 23, 1990

[54] STABILIZATION OF EXTREMELY LIGHTWEIGHT AGGREGATE CONCRETE

[76] Inventors: Bengt Hedberg, Dr Heymans Gata 5, S-413 22 Göteborg; Leif Berntsson, Tågmästaregatan 10, 416 52 Göteborg, both of Sweden

[21] Appl. No.: 198,722

[22] Filed: May 18, 1988

Related U.S. Application Data

[63] Continuation of Ser. No. 18,773, Feb. 27, 1987, abandoned, which is a continuation of Ser. No. 740,059, filed as PCT SE84/00327 on Oct. 2, 1984, published as WO85/01499 on Apr. 11, 1985, abandoned.

[30] Foreign Application Priority Data

Oct. 5, 1983 [SE] Sweden ............................ 8305474

[51] Int. Cl.$^4$ .................. C04B 14/02; C04B 24/24; C04B 24/36
[52] U.S. Cl. ........................................ 106/86; 106/88; 106/89; 106/90; 106/314; 106/315
[58] Field of Search .................. 106/86, 88–90, 106/314, 315

[56] References Cited

U.S. PATENT DOCUMENTS

| | | | |
|---|---|---|---|
| 4,142,910 | 3/1979 | Kraemer et al. ............ | 106/86 |
| 4,202,809 | 5/1980 | Eash ........................ | 106/90 |
| 4,230,502 | 10/1980 | Lustig et al. .............. | 106/314 |

FOREIGN PATENT DOCUMENTS

| | | | |
|---|---|---|---|
| 2856764 | 7/1979 | Fed. Rep. of Germany ........ | 106/90 |
| 2507177 | 12/1982 | France ........................ | 106/86 |
| 52-4532 | 1/1977 | Japan .......................... | 106/86 |
| 1593436 | 7/1981 | United Kingdom . | |

*Primary Examiner*—Mark L. Bell
*Assistant Examiner*—David M. Brunsman
*Attorney, Agent, or Firm*—Balogh, Osann, Kramer, Dvorak, Genova & Traub

[57] ABSTRACT

Method of producing monolithic mainly cementbound concrete in the density range of 650–1300 kg/m$^3$, preferably of 800–1200 kg m$^3$ with substantially good placing properties both for building in situ and prefabrication. The concrete consists of cement mortar with an air-void volume of 7–18% of the total concrete volume and aggregate consisting of lightweight organic or inorganic material. The smaller particles of the aggregate should be spherical, exceptionally lightweight, hydrophobic and durable against deformation in order to reduce the water content without changing the consistency of the concrete. The production of concrete is based on the aggregate having a continuous distribution of particle size within which the particle density decreases with decreased particle size, that during mixing small as well as big air-voids are created with strengthened and thickened bubble walls, that the thixotropy of the cement paste is strengthened and that air bubbles are replaced with an equivalent volume of sand particles in excess of those which are needed for the creation of air bubbles. The effects are achieved with multifunctional polymer microparticles on which different surfactant systems have been adsorbed. Air bubbles with their thickened walls as well as the most lightweight aggregate particles reduce the difference in density between the continuous medium and the air bubbles - aggregate particles.

8 Claims, No Drawings

STABILIZATION OF EXTREMELY LIGHTWEIGHT AGGREGATE CONCRETE

This application is a continuation of application Ser. No. 07/018,773, filed Feb. 27, 1987, abandoned, which is a continuation of application Ser. No. 740,059, filed as PCT SE84/00327 on Oct. 2, 1984, published as WO85/01499 on Apr. 11, 1985, abandoned.

This invention relates to a method of producing stable, non-segregating lightweight aggregate concrete of extremely low density and monolithic structure, which is attained by introducing an especially stable air-void system consisting of small as well as large spherical air bubbles and by partly replacing middle sized aggregate particles by particles of extremely low density. The walls of the air bubbles have been strengthened by flocculating the cement particles. With proper aggregate composition, as far as the size and grading of the aggregate and the properties of the air-void system is concerned, a concrete mass is achieved with good handling and placing properties such as mobility, homogeneity and non-segregation stability. By proper composition is here understood selection of a middle-sized aggregate fraction of spherical, extremely lightweight, hydrophobic and permanently elastic particles. This results in a reduction of water content without change of consistency. In the hardened state the concrete possesses those properties, which characterize a concrete type of particularly good durability to climatic deterioration or in other words weathering.

In concrete technology, there exist many well-known ways of producing concrete with lower densities than normal concrete. Reduction of density may be achieved either by increasing the porosity of the cement mortar i.e. by increasing the air volume at the expense of solids, by air or gas entrainment, or by replacing solid material components by substances of lower density. Examples of the use of the first principle are gas concrete, non-fines concrete and foamed concrete. A type of the second principle is monolithic lightweight aggregate concrete. A combination of the two methods is furthermore known and utilized.

Replacing the heavy aggregate in normal concrete by an aggregate of lower density introduces many problems. As a result of the differences in density between particles of low density, solid particles and surrounding cement mortar or cement paste, the continuous phase segregation occurs during handling and placing. This problem has been sovled for 3L-concrete by the addition of a small amount of an air-entraining agent consisting of polymer micro-particles. What is meant by 3L-concrete is described in Swedish patents 7614519-2, 7614518-4 and 8100189-7. Non-fines concrete of lightweight aggregate, foamed concrete and gas concrete have densities in the range of 300–700 kg/m$^3$.

Furthermore it is well-known that concrete of low density is obtained by mixing aggregates having particle density less than 100 kg/m$^3$ and particle size in the range of 0–3 mm together with aggregates having particle size greater than 3 mm. In all of these solutions involving mixing of aggregate particles of extremly low density stability problems occur in mixing the fresh concrete. These problems have been solved in many ways e.g. by adding thickeners, air-entraining admixture, plastifier with air-entraining properties or epoxiemulsion in order to obtain an adhesive surface on the lightweight aggregate-particles.

In the range of density of 650–1050 kg/m$^3$ there does not exist today any cemented concrete masses with good properties suitable for producing monolithic concrete structures (from Greek monos=one and lithos=-stone). Above all there is a lack of concrete types that are suitable for casting in situ.

Decreasing the density of concrete by replacing the high density aggregate by a lightweight aggregate is possible as regards fine particles, such as sand, as well as coarse particles, such as stones. The most usual procedure involves replacement of aggregate particles within the coarse region. Within the fine particle region particles may be replaced by minute air-bubbles. With regard to the existence of fine aggregate of size of 0.2–0.6 mm in order to create air-voids in cement mortar, the fine particles may be replaced outside this region ($<0.2$ respectivly$>0.6$ mm) by air-voids. The volume of the air-voids is determined by the type and amount of air-entraining agent whereas the size distribution is regulated by the grading of the aggregate and the type of air-entraining agent. The problem of stabilization of the air bubbles is solved by this invention.

Relating generally to the field of building materials, it is important to note that together with the increased possibility to make lightweight materials it should be simultaneously possible to minimize the usually inevitable impairment of technical properties and and durability of such materials. The present invention provides the solution that the durability of concrete, such as the ability to resist weathering, corresponds to the durability of high-quality concrete and is even superior to this in some respects.

In order to obtain a monolithic concrete structure in which the space between the aggregate particles is completely filled up, a definite and exceedingly small volume of cement-binder in which air voids may be included is required. The mobility of the concrete necessitates the use of a certain excess volume of continuous binder as compared to that needed theoretically. With regard to the properties of hardened concrete, the excess volume should be exceedingly small. Concrete with good properties for placing i.e. a mobile and stable concrete mixture requires that the distribution of particle size of the aggregate has by volume a continuous distribution without gap grading. Further the aggregate particles should have nearly spherical shape. Theories and models for a continuous particle distribution of the aggregate are to be found in the literature. "Fuller" grading is often used as a standard for the desired distribution of aggregate particles. It appears from this that the margin of the volume of different concrete components is fairly restricted.

A well-designed monolithic lightweight aggregate concrete has approximately the following composition:

| cement | 10 percent by volume |
| --- | --- |
| water | 20 percent by volume |
| air pores | 10 percent by volume |
| fine aggregate | 10 percent by volume |
| coarse aggregate | 50 percent by volume |

From the durability point of view it is not desirable to increase the volume of air voids with the intention of reducing the density of the concrete. Bubbles open to water penetration increase the area of attack resulting in rapid degradation. The density of the concrete will depend mainly on the density of the aggregate particles according to the table above. It is generally believed that the air void system should be given definite characteristics such as volume and size distribution in order to obtain good frost resistance. In most cases a maximum spacing factor is specified, which among other things is needed for calculating the lowest critical air volume.

Air bubbles are created during the mixing procedure. Sand particles with diameter of 0.2–0.6 mm have in this respect appeared to be of great importance for the formation of air bubbles. The mechanism of the formation is based on co-operation between stirring air-entraining agent, cement particles, water- and sand-particles. These particles will give roughness at the free interfaces between water and air. When two opposite surfaces join, an air bubble will be enclosed. Sand-particles are to be found afterwards near to the air voids and they give geometrical and mechanical protection against collapse. Experiments supported by theoretical argumentation have shown that the particle density of the different sizes has great importance for the stability of the fresh concrete. Hereby it is desirable that the particle density should decreases with decreasing diameter of the particles. Supporting this it can be stated that the relation between the particle density, the density of the surrounding matrix, cement mortar or paste, the diameter of the particle and the buoyancy speed rate of the particle is expressed by Stokes formula. Normally the particle density increases with decreasing particle size for porous aggregates. This is particularly pronounced for a synthetic mineral aggregate, which has been sintered to particles in rotary kilns, e.g. expanded clay aggregate. Most lightweight aggregates will suffer from an unfavorable distribution of particle density. By addition of a specially adjusted composition of polymer microparticles, in which particles with different properties and mode of action are included, the segregation has been prevented by strengthening the thixotropy of the cement paste and by thickening of the border region close to air bubbles.

In the hardened concrete hydrophobic properties are obtained and uniformly distributed in the structure after drying.

In order to prevent segregation of the components of the fresh concrete the following should be noticed:

1. Balancing by dynamic and gravimetric segregation. The dynamic effect is reached during vibration, for example when the viscosity of the paste decreases and when aggregate particles of different size and density are able to move mutually relative to one another.

2. Strengthening the thixotropy of the cement paste. Thixotropy manifests itself as a difference between the viscosity of the cement paste at rest and during vibration. The concrete is sufficiently mobile and formable only during compaction.

3. Increasing the adhesion between aggregate and cement paste by improving the wetting ability. This is specially important when the surface of the aggregate has low affinity to water i.e. the particles have hydrophobic surface.

4. The locking effect between the aggregate particles. To ensure locking a certain small proportion of coarse aggregate particles and a certain distribution in comparison to the other smaller particles are required.

5. Stable air void system. The air voids are created during mixing by lowering the surface tension of the water or by adsorbing with hydrophobic-hydrophobic particles at the air-water interfaces. The stability depends on strength, deformability and impermeability of the bubble walls, which surround the air voids.

Air voids together with their walls increase the mobility of the concrete at the same time as they hinder the single aggregate particles from moving freely.

The risk of segregation is especially great when the density of the aggregate particles differs considerably from the density of the surrounding continuous matrix as the viscosity of this matrix is low, for example during vibration and when the volume of the aggregate is small. The classical theory referring to the stability of concrete is based on the influence of the gravitation forces on the individual discrete components and on the variability of the properties with time under the influence of superimposed forces. Bird. Stewart and Lightfoot have proposed a mathemtical relationship applicable to moving particles in different media.

Stokes' formula may be considered as a special case of this relationship. The velocity of the particles according to Stokes' formula may be calculated by using following expression:

$$v = \frac{d^2 \cdot \Delta\rho \cdot g}{18\eta}$$

where d is the diameter of the particles, $\Delta\rho$ is the difference between the density of the particles and the continuous matrix and $\eta$ is the viscosity of the matrix. Stokes' formula is usually used when discussing the stability of fresh concrete. Regarding air-voids the cement paste should be considered as a matrix, and for the aggregate particles all of the matrix including particles of smaller size than the smallest aggregate particle. Pure cement paste has the lowest viscosity and the more air voids and particles added to the paste, the more the viscosity will increase. The final result is that when the diameter of the particle increases the difference between the density of the particles and the density of the matrix should be reduced and at the same time the viscosity increased in order to keep the velocity constant. This will be fulfilled for lightweight aggregate concrete if the particle density decreases with increasing particle size. The movement of the largest particle should be brought to a minimum. The attraction forces (different charge) between mutual cement particles may explain the flocculated state which is the case in pure cement paste. By adding energy, i.e. vibrations, these attraction forces will be counteracted and the viscosity will decrease. It is known that it is possible to strengthen the cohesiveness and thixotropy by adding small solid particles with specific properties, for example particles of $Al_2O_3$ and $SiO_2$. As part of the invention, there is an addition of a destabilized surfactant covered polymer particle of about the same size as medium cement particles. Such polymer particles are equally distributed in the cement paste and increase the thixotropy.

One of the problems of immediate interest to the development of concrete technology is to produce stable air void systems. A conventional solution amounts to adding some admixture known as an air entraining agent which acts at the molecular level by adsorption at the interfaces water-air, by partly hydrophobizing cement particles or by precipitating and creating partly hydrophobic flocks. In all cases, adsorption occurs at the interfaces water-air.

The present invention provides novel and improved process steps for producing stable and extremely lightweight aggregate concrete of a density of 650–1,300 kg/m$^3$.

The known methods provide for mixing and stirring of cement, sand, water, an air entraining agent and an aggregate consisting of a mixture of lightweight organic and inorganic materials. During the mixing process, large and small air voids are created or formed in the concrete mixture, at free interfaces between water and air, and opposing surfaces in the mixed concrete.

The present invention teaches that, before the mixing step, there is a selecting step, wherein a lightweight hydrophobic and permanently elastic aggregate material is selected.

This aggregate material has a predetermined continuous particle and density distribution within which the particle density decreases with decreased particle size, and wherein a coarse part of the aggregate material has higher particle density than a fine part of the aggregate material.

The invention provides also for an additional step of adding to the concrete mixture multifunctional polymer microparticles of two definite sizes:

A first group of these microparticles has a diameter size of 0.1–1.0 μm and is adapted to stabilize the air voids at the surfaces thereof by adsorption at the water/air interfaces; and A second group of these microparticles has a diameter size of 1–5 μm and is adapted to form thickened or strengthened walls around the air voids so as to stabilize the same by flocculating with cement grains.

The invention utilizes a synthetic hydrophobic polymer particle covered with a calcium-stable anionic surfactant. The particle has a diameter of about 1/10 of the average size of the cement particles, i.e. 5 μm. By adjusting the hydrophility and hydrophobity of the particles, they are capable of being absorbed at the interfaces between air and water and thus making a contribution to the creation and stabilization of the air voids. The concentration of the polymer microparticles at the surface of the air bubbles has been studied by the SEM-technique.

The above mentioned larger polymer particles, which strengthen the thixotropy, will be concentrated close to the walls of the air voids during mixing, where the thixotropy and the cohesiveness will be further strengthened. To that the smaller microparticles will also make a contribution.

The mobility of the concrete mass with its aggregate and air voids is located at shear surfaces between the aggregate particles and the air voids. When that happens something like a strong shell is formed around the air bubbles which counteracts the recombination of the air voids and retards the air diffusion. The procedure of building strong walls at the air bubbles during stirring or kneading and other treatment at the fresh state by activation of multifunctional polymer particles on whose surfaces different systems of surfactants have been adsorbed, is described below.

Strengthening of the air void system is based on utilization of different polymer particles, above all stabilized by different surfactants. It is preferable that the polymer particles should be stable among themselves and that they can be mixed and stored in the state of one single dispersion with the concentration of 10 to 50%. The first type consists of small microparticles with diameter of 0.1–1.0 μm, stabilized by an anionic or anionic-nonionic surfactant, mostly stable to calcium ions (divalent cations) and high pH-values (>12). The polymer particles may consist of homopolymers or copolymers with hydrophobic as well as hydrophilic groups, preferably hydrophobic. Their distribution should be adjusted to the surfactant system among other things. The actual substance of the particles may be film-forming or not on the walls of the air pores or capillary pores at normal temperatures. In the hardened concrete semipermeable polymer membranes are formed. By their hydrophobic properties and limited permeability they positively influence the durability of the concrete.

The second type included consists of polymer particles, natural or synthesized, with diameters of 1–5 μm, corresponding to the average diameter of cement particles, stabilized with one or more anionic non calcium-stable surfactant or a surfactant unstable at high pH-values. On the surface of the particles, mainly hydrophobic groups should be adsorbed. With the two polymer particles described, the purpose is to create and stabilize air voids into mortar and concrete during mixing. Some surface-active agents or surfactants can, depending on their structure, be absorbed at surfaces. The hydrophobic parts of the surfactants are adsorbed at surfaces with hydrophobic character. such as hydrophobic particles. Addition of cement and aggregate particles to the polymer dispersion means that fresh surfaces are added and surfactants may be transfered from polymer surfaces via waterphase in the concrete to the fresh surfaces even if these are predominantly of hydrophilic character. By such a redistribution of the surfactants at the fresh surfaces the hydrophobic surface, of the polymer particles will increase and thus the ability itself to be absorbed at the interfaces into the surfaces of air bubbles. The stripping effect can be strengthened by adding fresh hydrophobic surfaces to the concrete, such as polymer particles whose surfaces have not previously been covered with surfactants. The polymer particles may have the same sizes as aggregate particles or smaller. Tranferrance and adsorption increase in strength with the increased hydrophobicity. The quantity of redistributed surfactant is proportional to the hydrophobic area. The described phenomenon is linked to the calcium-stable surfactants.

The other type of polymer particles with destabilized surfactant will rapidly be changed or converted on contact with the mixing water so that the polymer microparticles are no longer dispersable. Owing to this, surfaces will lose their charge or be stripped by precipitation of the surfactant. The particles may be flocculated or in one way or other added to cement or aggregate particles. The thixotropy of the cement paste will be strengthened.

In mortar and concrete, air voids are formed by polymer microparticles adsorbed at the surface of the air voids according to the same mechanism which causes the creation of air voids in 3L-concrete. A further effect consists of the influence of the destabilized polymer particles in order to build the strong layer around the air voids. From the Stokes' formula it appears that it is the larger air voids, e.g. of φ100–500 μm, which are not easily influenced by gravitation and for that reason could most easily be separated. During mixing, the movement at shear surfaces will occur near to the surfaces of the air voids but not in the air pores themselves. As stated earlier polymer particles are already adsorbed at these surfaces. Through the movement in the neighborhood of the air voids, the remaining destabilized polymer particles will be fixed at the adsorbed particles on the surface or even to one another. In this way polymer particles will be concentrated at the walls of the air voids so these will be strengthened. The air voids can be regarded as a part of an empty particle with walls of cement paste stabilized by polymer particles.

The state described has been verified by microscopy, whereby a comparison has been made between different types of air entraining agents. An obvious difference is observed between the structure of the walls when using conventional air entraining agents and using only polymer particles with an air-void stabilizing effect, showing more or less far advanced recombination. The density of the so-called air-void particles or the apparent density may be calculated from the expression:

$$\rho_{void} = \gamma_{wall} \cdot (D + 2t)^3 \cdot \left[1 - \left(\frac{D}{D+2t}\right)^3\right]$$

where t is the thickness of the wall and D is the diameter of the air void. For a thickness of 1/10 of the diameter, the apparent density of the air pore will be in the region of 600–800 kg/m$^3$, i.e of the same density as normal lightweight aggregate.

An essential part of the invention is the use of variously acting polymer microparticles with the purpose of stabilizing air pores and concrete masses of lightweight aggregate particle. The microparticles have two sizes and they have been stabilized by different surfactant systems. The small particles should be μm mainly spherical, have a diameter of 0.1–1.0 μm, be chemically inert in comparison to the remaining components of the mortar and should be distinguished by their surface which is hydrophobic. On this hydrophobic surface an anionic or weakly anionic (anionic-nonionic) surfactant has been adsorbed corresponding to 0.1–5.0 percent by weight calculated for the surface of the particle. The surfactant should be stable or partly stable with respect to calcium ions and high pH-values. As a particle shaped product, a homopolymer or a copolymer of styrene and/or one or more esters of acrylic or methacrylic acid should be used, with the general formula $$\begin{array}{c} R_1 \\ | \\ CH_2=C-COOR_2 \end{array}$$

where $R_1$=H or $CH_3$ and $R_2$=alcohol radical with 1–18 carbon atoms as methyl acrylate, ethyl acrylate, propyl acrylate, hexyl acrylate or 2-ethylhexylacrylate, methyl methacrylate, ethylmethacrylate, butylmethacrylate, hexylmethacrylate, 2-ethylhexylmethacrylate and that these polymer particles should have one particle size of preferably 0.1–1.0 μm and that on their surface there has been absorbed 0.1–3.0 percent by weight calculated on the whole masses of the particles of an anionic or weakly anionic surfactant or a combination of an anionic and nonionic surfactant. Variants may be particles whose hydrophobic part consists of styrene or acrylates. In a second variant, the particles may consist of a copolymer of the type acryl-vinylidenchloride or a pure vinyllidenchloride on the surface of which 0.1–3.0 percent by weight of an anionic surfactant or anionic-nonionic surfactant combination has been adsorbed. A third variant of this particle material may consist of particles of a copolymer of styrene-butadiene on the surface of which 0.1–5.0 percent by weight of anionic or anionic-nonionic surfactant have been adsorbed. Further the particle material may consist of polyethylene on the surface of which anionic or nonionic surfactant combination has been adsorbed by the amount 0.1–5.0 percent by weight.

The rest of the particles consists of the larger type with particle diameter of 0.5–10 μm, preferably 1–5 μm of a synthetized type or nonsynthetized hydrophobic natural product such as asphalt on the surface of which an anionic calcium destabilization surfactant has been adsorbed. As surfactants, for example, soaps of different types may be used.

The particle material of synthesized types may be most simply produced by emulsion polymerization according to an earlier known. But the hydrophobic-hydrophilic balance, which is reflected by the existing equilibrium of the particles between the hydrophobic particles and the particles adsorbed, quantity of anionic or anionic-nonionic surfactant combination of calcium stable character, is by no means the one which is reached by an wholly conventional emulsion polymerization.

The balance between the hydrophobic, synthetic, smaller particles and on their surfaces adsorbed quantities of anionic or anionic-nonionic surfactant combination indicate in a relatively way, as acurately as possible, the quantity of surfactant which may be stably adsorbed on the surface of the particles. The material of the larger particle size should be covered with such a surfactant that the destabilization and precipitation can take place so rapidly and completely that these particles do not acquire adsorbing properties for the interfaces of water-air. This is possible by using surfactants belonging to the soap types. The particles are a part of the mixture of cement-grains and water with an even distribution and are especially concentrated at the walls of the air voids. The ratio between the small and large ones appears to be about 5–30%, preferably 15–25%. A too large amount of the calcium sensitive particles may increase the required water to cement ratio and thereby impair the properties of the hardened concrete. Further a too large proportion of big polymer particles may cause inhomogenity of the cement paste.

The surfactants, which are used for stabilizing the smaller polymer microparticles, are even active in wetting the surface of the aggregate there. Principally this is valid for surfactants which are calcium stable. As hydrophobic aggregate may be mentioned those which consist of polystyrene, polyethylene, polyvinylchloride etc. In general the larger the hydrophobity of the surfaces the stronger they will adsorb the surfactant. Wetting is essential for the combination with water in the cement paste. The calcium sensitive surfactant which belongs to the stabilization of the large polymerparticles is to be found even free and unadsorbed. By binding calcium ions the surfactants have lost their surfactant effect but may contribute as a hydrophobic matter in the cement paste. A known method is to add soaps in order to hydrophobize concrete. It is practical to quantify the total amount of added polymer microparticles according to the amount of cement. The described effects are reached at an addition of 0.2–3.0 percent by weight for the cement of all the included and defined microparticles, preferably 0.4–1.2%. Then it is possible to get an air void volume in the range of 0.06–0.18 m$^3$/m$^3$ of the total volume of concrete, mostly in the range of 0.08–0.12 m$^3$/m$^3$. Here it is assumed that the amount of cement is totally of 300–350 kg/m$^3$ and that pure portland cement of the specific surface of 300–400 m$^2$/kg has been used.

The following tests show the influence of dynamic segregation, directed against gravimetric segregation:

1. Lightweight aggregate with particle size of 4-8 mm and particle density of 700 kg/m$^3$ is mixed with particles of expanded polystyrene with particle size of 2-4 mm and particle density of 30 kg/m$^3$ with the volume ratio of 1:1 in a container with transparent walls. The container is placed on a vibration table, at a frequency of 50 Hz, and the course of segregation during vibration is observed. After about 30 seconds the larger part of the lightweight polystyrene particles will be concentrated at the bottom of the container.

2. Normal fine sand (<2 mm) is added to the mixture of the lightweight aggregate according to Step 1 above. During vibration it is observed that the fine sand tends to stabilize the mixture and the segregation is delayed.

3. Concrete is prepared with the following composition.

| | |
|---|---|
| Cement | 315 kg/m$^3$ |
| Sand, 2-4 mm | 300 kg/m$^3$ |
| Cellular polymer particles 2-4 mm | 8 kg/m$^3$ |
| Lightweight aggregate, 4-12 mm | 200 kg/m$^3$ |
| Water | 170 kg/m$^3$ |

Air entraining agent 0.05% by weight of the amount of cement (5% air by volume).

The concrete is poured into a mold, with a height of at least 50 cm. After one day the element is removed from the form and is cut vertically. It is now possible to observe a distinct segregation. The more lightweight polystyren particles have been displaced towards the bottom of the element by dynamic segregation.

4. Concrete with the composition according to paragraph 3, where the conventional air entraining agent has been replaced by the polymer dispersion is described in the Swedish patents 7614519-2, 7614518-8 and 8100489-7. The concrete will now contain air voids with a total volume of about 10%. During vibration the air voids will counteract the segregation of the aggregate—because the air voids have a tendency not to leave the cement paste but to be pushed towards the vibration source. The added, exceptionally lightweight aggregate particles consist mainly of expanded polystyrene with particle diameter of 0.5-4 mm. The added polymer microparticles were 0.5-3% of the cement weight, particularly 0.5-1.0%. The volume of added expanded polymer particles was 5-55% of the volume of the aggregate. With the described multifunctional microparticle composition, the following results have been obtained.

FRESH CONCRETE

When preparing the concrete, the expanded polystyrene particles may be added after the addition of microparticles has partly reached its intended effect ont he other components. Furthermore air-voids are also obtained in connection with wetting of the polymer surface of the hydrophobic aggregate. The interval of the concrete consistency in the density range of 700-1.200 kg/m$^3$ the flow table test value is 30-40 cm. The corresponding value for 3L-concrete is 36-42 cm. The cohessiveness and homogenity may be estimated by the flow table test in the same way as for normal concrete or 3L-concrete. Compaction of the concrete requires somewhat reduced and more distributed compaction energy. During compaction by vibration, negligible segregation of both the lightweight and the heavy aggregate particles or of the cement paste is obtained. An important observation is that it is possible to reduce the quantity of water added in comparison to mixtures without expanded polystyrene particles and yet keep the plasticity and cohesiveness unchanged. As regards normal concrete it is known that air-voids decrease the water content without changing the consistency. The rule of thumb is that 1% increase of the air content, reduces the water content by 5 l/m$^3$.

By addition of expanded polystyrene particles or similar aggregates, the water content could be reduced by 25% referred to the total volume of the air voids and expanded polystyrene particles without changing the consistency.

It is important for good concrete properties in general to reduce the amount of mixing water without changing the consistency. This was found to be possible by interchanging some aggregate fractions as previously described.

The particles should have spherical shape, not be water absorbing, have extremely low particle density and great deformability. One ofthe materials which fullfills these demands is expanded polystyrene particles of size from 0,5 mm up to slightly more than 8 mm. The particles act by affording good mobility to the concrete, i.e. ballbearing effect. The mixting time could be kept short and the air entrainment facilitated.

HARDENED CONCRETE

The strength of the hardened concrete follows the relationship which is to be found in the Olav Berge's Ph.d. thesis "Reinforced lightweight aggregate concrete structures" (in Swedish) and may be assumed to be a function of the equivalent strength of the mortar and aggregate and their volumes. The tests, which have been carried out, indicate that the average strength is 10-15% higher than the expected values. This may be explained by the formation of nearly spherical cavities with strenghtened shells or walls of cement paste around the spherical expanded polystyrene particles. This shell effect indicates a positive influence on the strength. The shell structure has an obvious similarity with that which has been described above for air-voids with their positive consequences even in the fresh state such as increasing the particle density. In the density range tested i.e. 700-1.200 kg/m$^3$ the compressive strengths are 4.5-14.0 MPa.

The increase in relative strength is greater than for 3L-concrete and also considerably greater than for normal concrete. As an indication, it can be mentioned that a 1-day strength was found to be more than 50% of the 28-day strength after normal curing.

The positive effects in the hardened concrete are as follows:

Very good frost resistance, independent of which testmethod has been used and even better than the frost resistance of 3L-concrete.

Fire resistance has proven to be surprisingly good. At high temperatures the polystyrene will melt and cover the hydration products and a film of polymer is formed in the cavity-wall. A naked flame applied to polystyrene particles in the concrete surface does not cause gases to develop to the extent needed for ignition and maintained burning.

As guidance values of the thermal conductivity of the concrete the following may be used:

| Density (kg/m³) | Coefficient of thermal conductivity (W/mK) |
|---|---|
| 700–800 | 0,14–0,20 |
| 900–1.000 | 0,18–0,28 |
| 1.200–1.400 | 0,40–0,50 |

Adding polystyrene particles to concrete, leads to reduced water absorption. As a consequence, the particles themselves do not absorb water either in the fresh or hardened concrete. Low water content in the concrete also implies reduced moisture and shorter drying time.

It is possible to deliberately sinter the polymer in the surface area of the concrete by local heat treatment or by swelling with proper solvents.

The following examples are related to the concrete types produced in the way which is characteristic for the material:

EXAMPLE 1

Fraction 1–4 mm polystyrene. 4–12 mm lightweight aggregate

| Material | Material mass (kg) | Volume |
|---|---|---|
| A. Density grade: 700 kg/m³ (28 days), 750 kg/m³ (fresh) | | |
| Cement | 240 | 79 |
| Sand | 160 | 60 |
| Polystyrene | 10 | 245 |
| Lightweight aggregate | 200 | 333 |
| Water | 136 | 136 |
| Air | — | 150 |
| B. Density grade: 800 kg/m³ (28 days), 850 kg/m³ (fresh) | | |
| Cement | 250 | 79 |
| Sand | 220 | 83 |
| Polystyrene | 6 | 198 |
| Lightweight aggregate | 228 | 380 |
| Water | 143 | 143 |
| Air | — | 120 |
| C. Density grade: 900 kg/m³ (28 days), 950 kg/m³ (fresh) | | |
| Cement | 275 | 87 |
| Sand | 230 | 87 |
| Polystyrene | 8 | 209 |
| Lightweight aggregate | 280 | 350 |
| Water | 157 | 157 |
| Air | — | 110 |
| D. Density grade: 1000 kg/m³ (28 days), 1050 kg/m³ (fresh) | | |
| Cement | 300 | 95 |
| Sand | 260 | 98 |
| Polystyrene | 5 | 133 |
| Lightweight aggregate | 317 | 396 |
| Water | 168 | 168 |
| Air | — | 110 |
| E. Density grade: 1100 kg/m³ (28 days), 1145 kg/m³ (fresh) | | |
| Cement | 310 | 98 |
| Sand | 318 | 120 |
| Polystyrene | 3 | 82 |
| Lightweight aggregate | 344 | 430 |
| Water | 170 | 170 |
| Air | — | 100 |
| F. Density grade: 1200 kg/m³ (28 days), 1245 kg/m³ (fresh) | | |
| Cement | 325 | 103 |
| Sand | 320 | 120 |
| Polystyrene | 1 | 32 |
| Lightweight aggregate | 423 | 470 |
| Water | 175 | 175 |
| Air | — | 100 |

EXAMPLE 2

Fraction 1–4 mm 80% lightweight aggregate and 20% polystyrene, 4–12 mm lightweight aggregate

| Cement | 300 | 95 |
|---|---|---|
| Sand | 305 | 115 |
| Polystyrene + Lightweight aggregate | 143 | 281 |
| Lightweight aggregate | 219 | 249 |
| Water | 162 | 162 |
| Air | — | 97 |

EXAMPLE 3

Fraction 1–4 mm polystyrene, 4–12 mm slag aggregate (particle density 1600 kg/m³)

| Material | Material mass (kg) | Volume |
|---|---|---|
| Cement | 310 | 99 |
| Sand | 256 | 97 |
| Polystyrene | 8 | 200 |
| Slag | 539 | 337 |
| Water | 167 | 167 |
| Air | — | 100 |

Example 2 indicates that it is possible to adjust the average density of an aggregate fraction in order to reduce the density of the concrete. Example 3 indicates that it is possible to reduce the cost of the concrete by using cheaper components.

We claim:

1. Method of producing a monolithic lightweight aggregate concrete of a density of 700–1200 Kg/m³ in fully dried condition composed of lightweight cement mortar including hydraulic cement, sand, fine and extremely lightweight particles, air bubbles and water mixed together with coarse lightweight aggregate, characterized by the fact that the low density of the cement mortar of the lightweight aggregate concrete is constituted by replacing sand at least partly by an equivalent volume of small air bubbles with a diameter in the range of approximately from 20 to 500 micrometers so that the volume of air bubbles is in the range of 5 to 30% of the volume of cement mortar and expanded organic and inorganic aggregate of particle density less than 200 Kg/m³ and of a size approximately from 0.2 to 2 mm and a volume from 5–20% of the volume of cement mortar in such a way that the total particle volume of the cement mortar constitutes nearly a continuous size distribution, the stability is increased and the homogenity is maintained of the fresh cement mortar and concrete by adding polymer microparticles and equivalent organic microparticles in the amount of 0.1–5.0% of the cement weight, said polymer microparticles consisting of a mixture of at least two different types, a first type consisting of synthetic polymer particles having a diameter of 0.1–1.0 micrometers on the surface of which an anionic or a combination of anionic-nonionic calcium stable surfactants have been adsorbed to an amount of 0.1–5.0% by weight of the synthetic polymer, and a second type consisting of natural or synthetic polymer microparticles having a diameter of 0.5–10 micrometers on the surface of which an anionic or anionic-nonionic calcium destabilizable combination of surfactants have been adsorbed to an amount of 0.1-5.0% by weight of the natural or synthetic polymer, wherein the weight ratio between the second type microparticles and the first type microparticles is in the range from 1:3 to 1:6.

2. Method in accordance with claim 1, characterized by the fact that the fine aggregate particles of the cement mortar except sand particles are chosen from the group consisting of expanded polystyrene, polyethylene and polyurethene polymers of a particle density of 10-50 Kg/m$^3$ or substantially expanded inorganic particles of a density of 50-200 Kg/m$^3$ consisting of pumice, expanded clay, flyash, and perlite.

3. Method in accordance with claim 1, characterized by the fact that the coarse aggregate is chosen from the group consisting of organic, inorganic, synthetic and natural lightweight particles having a particle density less than 1,200 Kg/m$^3$ in dried condition with a size approximately from 2 to 25 mm, and particle volume between 30 to 50% of the total concrete volume.

4. Method in accordance with claim 1, characterized by the fact that the cement mortar of the concrete is stabilized in the fresh state with an admixture of polymer microparticles of equal hydrophobic-hydrophilic organic particles by deformable, stable air bubbles with thickened walls during mixing that the bubbles act as spherical extremely lightweight particles and the character of the microparticles also increases the thixotropy of cement paste.

5. Method in accordance with claim 1, characterized by the fact that the particle-shaped product of the microparticles to be incorporated in the mortar and concrete includes a homopolymer or a copolymer of styrene and one or more esters of acrylic or methacrylic acid with the general formula:

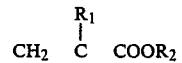

where $R_1$=H or $CH_3$ and $R_2$=an alcohol radical with 1-18 carbon atoms chosen from the group consisting of methacrylate, ethylacrylate, propylacrylate, butylacrylate, hexylacrylate or 2-ethylmethacrylate, methylmethacrylate, ethylmethacrylate, butylmethacrylate, hexylmethacrylate, and 2-ethylhexylmethacrylate with particle size of 0.1-10 micrometers on the surface of which surfactants have been adsorbed.

6. Method in accordance with claim 1, characterized by the fact that the particle-shaped product incorporated in the cement mortar and concrete comprises a copolymer of acrylic-vinylidenchloride or styrene-butadiene on which surface surfactants have been adsorbed or a natural surface with an active hydrophobic-hydrophilic organic combination of matter which chemically reacts with alkaline earth metals or polyvalent metals into fatty soaps.

7. Method in accordance with claim 1, characterized by the fact that the microparticles are located on the inner surface of the air bubbles and on the walls of the capillary pores and other cavities creating water-repellant properties after some drying and at the same time low resistance to water vapor transfer.

8. Method in accordance with claim 1, characterized by the fact that the consistency of the lightweight aggregate concrete is in the range of 35-45 cm according to a flow table test, DIN 1045.

* * * * *